(12) United States Patent
Baucom

(10) Patent No.: US 8,654,503 B2
(45) Date of Patent: Feb. 18, 2014

(54) HUMIDITY RESISTANT ELECTRONIC COMPONENTS

(75) Inventor: Allan Scott Baucom, Boxboro, MA (US)

(73) Assignee: Zoll Medical Corporation, Chelmsford, MA (US)

( * ) Notice: Subject to any disclaimer, the term of this patent is extended or adjusted under 35 U.S.C. 154(b) by 13 days.

(21) Appl. No.: 13/537,968

(22) Filed: Jun. 29, 2012

(65) Prior Publication Data

US 2014/0002954 A1 Jan. 2, 2014

(51) Int. Cl.
*H01G 4/30* (2006.01)

(52) U.S. Cl.
USPC ........ 361/301.5; 361/303; 361/305; 361/313; 361/512; 361/502

(58) Field of Classification Search
USPC .............. 361/301.5, 303–305, 311–313, 504, 361/523–528
See application file for complete search history.

(56) References Cited

U.S. PATENT DOCUMENTS

| | | |
|---|---|---|
| 5,933,318 A | 8/1999 | Tomono et al. |
| 6,288,890 B1 * | 9/2001 | Saito et al. ............ 361/523 |
| 6,580,112 B2 | 6/2003 | Miyai et al. |
| 2008/0232026 A1 * | 9/2008 | Ward ................. 361/311 |
| 2011/0014476 A1 | 1/2011 | Guy et al. |
| 2011/0143129 A1 | 6/2011 | Padiyath et al. |

OTHER PUBLICATIONS

International Search Report and the Written Opinion from corresponding PCT/US2013/047482 mailed Nov. 27, 2013.

* cited by examiner

*Primary Examiner* — Nguyen T Ha
(74) *Attorney, Agent, or Firm* — Lando & Anastasi, LLP

(57) ABSTRACT

A capacitor having improved tolerance to humidity. The capacitor includes a packaging material and/or a dielectric material comprising a film having a water vapor transmission rate significantly lower than the dielectric films and/or packaging films used in conventional capacitors.

6 Claims, 4 Drawing Sheets

HUMIDITY RESISTANT ELECTRONIC COMPONENTS

BACKGROUND

1. Field of Invention

Aspects and embodiments of the present invention are directed to humidity-resistant film laminates and to the application of such laminates for the protection of electronic devices including, for example, capacitors.

2. Discussion of Related Art

A capacitor is a device for storing electric charge. Some common forms of capacitors include two conductors, for example metal foils, separated by a non-conducting dielectric material, for example, a layer of insulating film. When a voltage is applied across the conductors, a static electric field develops across the dielectric, causing positive charge to collect on one conductor and negative charge on the other conductor. Energy is stored in the electrostatic field which maintains the charges in the conductors due to the attraction between the positive (holes) and negative (electrons) charge carriers on the two conductors. The ratio of the electric charge on each conductor to the potential difference between them is referred to as the capacitance of the capacitor. The capacitance of a capacitor is dependent upon such factors as the area of the conductors, the distance by which the conductors are separated by the non-conducting dielectric material, and the dielectric constant of the non-conducting dielectric material.

SUMMARY

In accordance with some aspects and embodiments of the present invention there is provided an improved capacitor having an increased reliability over time as compared to conventional capacitors. In accordance with other aspects and embodiments there is provided a method of forming a capacitor with an increased resistance to reliability problems caused by humidity as compared to conventional capacitors.

In accordance with an aspect of the present invention there is provided a capacitor comprising a rolled dielectric and metal film assembly encased in a polymeric film having a moisture vapor transmission rate of less than about 0.25 gram/m$^2$·day. In an embodiment, the polymeric film comprises at least one of polychlorotrifluoroethylene and silicon dioxide.

In accordance with another aspect of the present invention there is provided a capacitor comprising a plurality of layers of metal separated by a respective one of a plurality of dielectric layers, each of the plurality of dielectric layers having a moisture vapor transmission rate of less than about 0.25 gram/m$^2$·day. In an embodiment, the plurality of dielectric layers comprise polychlorotrifluoroethylene.

In accordance with another aspect of the present invention there is provided a capacitor comprising a dielectric film having a moisture vapor transmission rate of less than about 0.25 gram/m$^2$·day.

In accordance with another aspect of the present invention there is provided a method of forming a capacitor. The method comprises forming a first metal layer on a surface of a first dielectric layer having a moisture vapor transmission rate of less than about 0.25 gram/m$^2$·day, the first metal layer extending along a length and a width of the first dielectric layer but terminating prior to a first edge of first and second edges of the first dielectric layer that define the width of the first dielectric layer and forming a second metal layer on a surface of a second dielectric layer having a moisture vapor transmission rate of less than about 0.25 gram/m$^2$·day, the second metal layer extending along a length and a width of the second dielectric layer but terminating prior to a first edge of first and second edges of the second dielectric layer that define the width of the second dielectric layer. The method further comprises placing the first dielectric layer on top of the second metal layer with the first edge of the first dielectric layer disposed adjacent the second edge of the second dielectric layer to form a layered structure, and rolling the layered structure about itself to form the capacitor.

In an embodiment, forming the first metal layer on the surface of the first dielectric layer includes sputtering. In an embodiment, forming the first metal layer on the surface of the first dielectric layer includes physical vapor deposition.

In accordance with another aspect of the present invention there is provided a method of forming a capacitor. The method comprises forming a first partially metal coated film having a moisture vapor transmission rate of less than about 0.25 gram/m$^2$·day by depositing a metal layer on a surface of a first dielectric layer, the first metal layer extending along a length and a width of the first dielectric layer but terminating prior to a first edge of first and second edges of the first dielectric layer that define the width of the first dielectric layer and forming a second partially metal coated film having a moisture vapor transmission rate of less than about 0.25 gram/m$^2$·day by depositing a second metal layer on a surface of a second dielectric layer, the second metal layer extending along a length and a width of the second dielectric layer but terminating prior to a first edge of first and second edges of the second dielectric layer that define the width of the second dielectric layer. The method further comprises placing the first partially metal coated film on top of the second partially coated metal film with the first edge of the first dielectric layer disposed adjacent the second edge of the second dielectric layer, and rolling the first and second partially metal coated films to form the capacitor.

In accordance with another aspect of the present invention there is provided a capacitor comprising a dielectric film having a moisture vapor transmission rate of less than about 0.25 gram/m$^2$·day. In an embodiment, the dielectric film comprises polychlorotrifluoroethylene.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
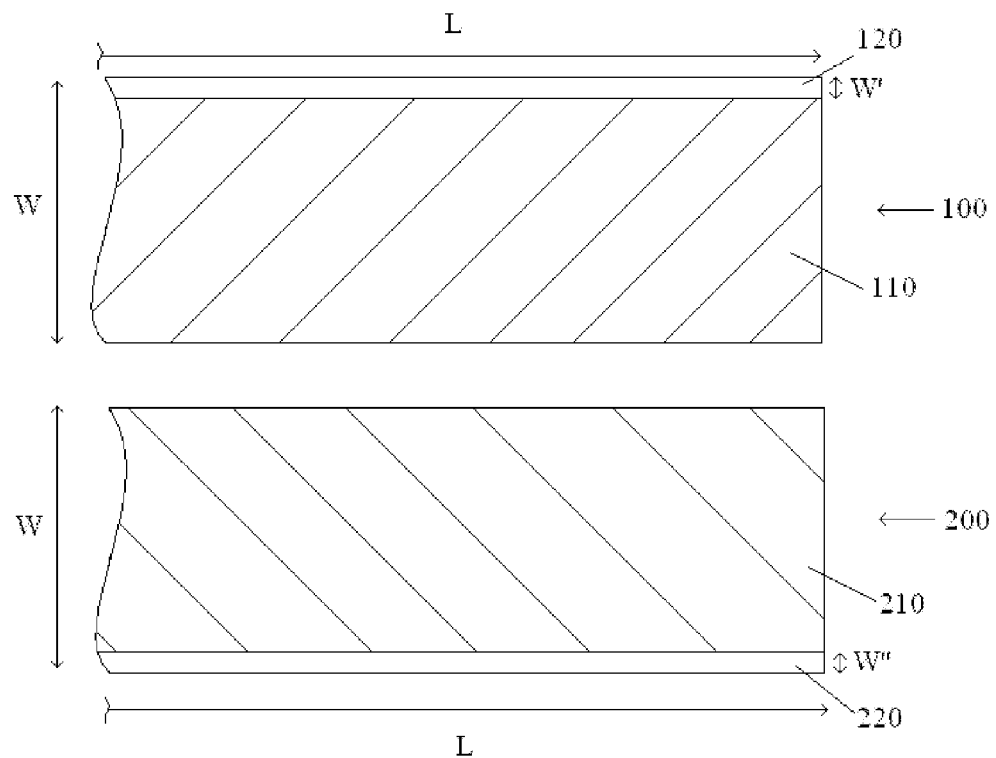
FIG. 1 is a plan view of a pair of films used in the construction of capacitors in accordance with some embodiments.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Conventional capacitors often include a pair of conductive films separated by one or more dielectric films. The conductive films may be formed from a thin film of a metal, for example, aluminum. The dielectric films may be formed from a thin film of a non-conductive polymer, for example, polyester.

It has been discovered that over time, the dielectric films used in many types of capacitors absorb moisture from the environment, especially when used in hot and humid environments. The absorption of water by the dielectric film may result in a change in a dimension of the dielectric film over time, for example, an increase in the thickness of a part or the whole of the dielectric film. This increase may result in an increase in the distance between portions (or all) of the conductive films of the capacitor which may, in turn, result in a decreased capacitance of the capacitor. In some capacitors, absorption of moisture by the dielectric film may alter the dielectric constant of a part of or all of the dielectric film, resulting in a change in the capacitance of the capacitor over time. An increase or a decrease in capacitance of a capacitor over time may result in reliability issues of a device in which the capacitor is used.

Aspects and embodiments of the present invention include providing a mechanism for reducing the susceptibility of a dielectric film used in a capacitor to change dimensions or physical properties over time in the presence of a humid environment. Aspects and embodiments of the present invention will be explained in conjunction with the figures attached hereto.

FIG. 1 illustrates a plan view of a pair of partially metal coated films 100, 200, which may be used in the formation of a capacitor in accordance with an embodiment of the present invention. The films 100, 200 include a layer of dielectric material 120, 220 with a thin layer of metal 110, 210 deposited thereon. The layers of dielectric material 120, 220 have lengths L and widths W, although it is not necessary that each dielectric layer have the same length or the same width. The metal layers 110, 210 may be deposited on the dielectric materials 120, 220 by sputtering, physical vapor deposition, chemical vapor deposition, or other methods of metal deposition known in the art. The metal layers are deposited such that small gaps of widths W and W, respectively, are left uncovered by the metal layers 110, 210 on the dielectric layers 120, 220.

The metal layers 110, 210 may be formed from a variety of metals, for example, aluminum, copper, or silver. The metal layers may have a thickness of, for example, about one micron, although different capacitor models may utilize different metal layers of different thicknesses depending on factors such as the cost of the metal and desired size of the finished capacitor. The dielectric layers 120, 220 may be formed of polymeric materials, for example, polyester, and may be provided as a rolled sheet of polymeric material. The dielectric layers 120, 220 may have a thickness of, for example, about one micron, although different capacitor models may utilize different dielectric layers 120, 220 of different thicknesses depending on factors such as the dielectric constant of the dielectric layers(s) and the breakdown voltage of the dielectric layer(s) as compared to a voltage at which the capacitor is intended to be used. For example, some capacitors rated for operation at voltages of about 3,000 V may have dielectric layers with thicknesses of between about 125 microns and about 250 microns.

Figure 2:
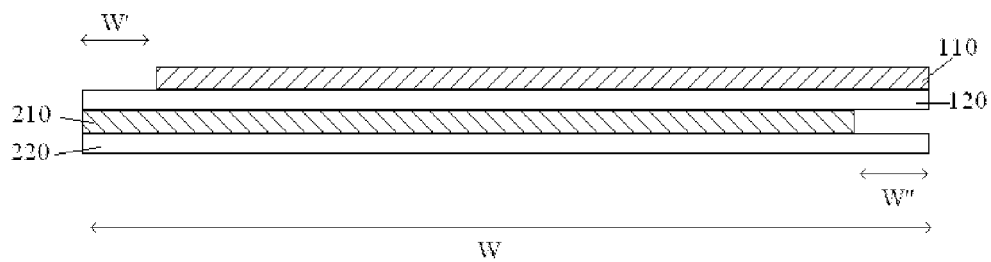
FIG. 2 illustrates a cross-sectional view of the pair of films of FIG. 1 positioned in contact with one another.
Figure 3:
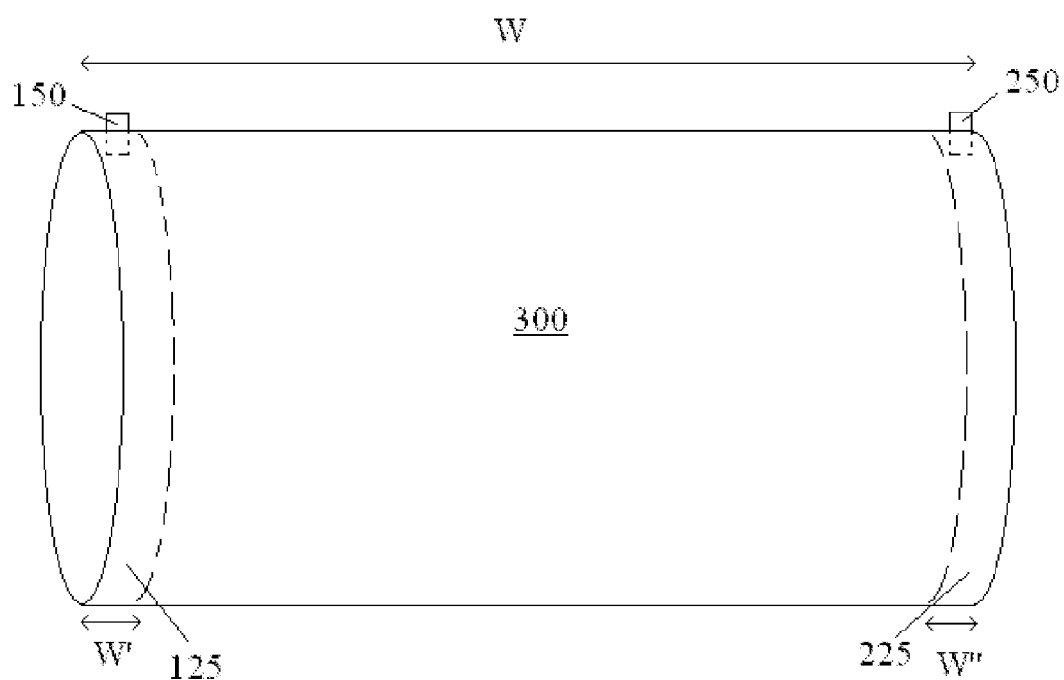
FIG. 3 illustrates the films of FIG. 2 rolled into a cylinder and provided with a pair of electrodes.

The partially metal coated films 100, 200 may be placed into contact with one another with one of the dielectric layers 120, 220 placed between the two metal layers 110, 210, and the films 100, 200 substantially aligned atop one another, as illustrated in FIG. 2. The partially metal coated films 100, 200 may be formed from the same film stock. The partially metal coated films 100, 200 may be cut from the stock of film, and one of the partially metal coated films 100, 200 may be rotated by 180 degrees and placed atop the other of the partially metal coated films 100, 200. The stack of the two partially metal coated films 100, 200 may then be rolled along the lengthwise direction to form a rolled film assembly 300, as illustrated in FIG. 3. The rolled film assembly 300 will have a region 125 of width W at one end wherein the metal layer 210 is present within the radius of the rolled film assembly 300 and the metal layer 110 is absent, and a region 225 of width W at a second end wherein the metal layer 110 is present within the radius of the rolled film assembly 300 and the metal layer 210 is absent.

A first electrical contact 150, for example, a conductive metal pin, may be inserted radially into the rolled film assembly 300 in the region 125 to make electrical contact with the metal layer 210. A second electrical contact 250, for example, a conductive metal pin, may be inserted radially into the rolled film assembly 300 in the region 225 to make electrical contact with the metal layer 110. Alternate methods of forming electrical contacts with the metal layers 110, 210 may also be utilized. For example, a first and a second external metal contact layer may be deposited, for example, by sputtering or by soldering on the two opposing ends of the rolled film assembly 300 to provide electrical contact between the first external metal contact layer and the metal layer 210 on the end of the film assembly 300 adjacent region 125, and to provide electrical contact between the second external metal contact layer and the metal layer 110 on the opposing end of the film assembly 300 adjacent region 225.

Figure 4:
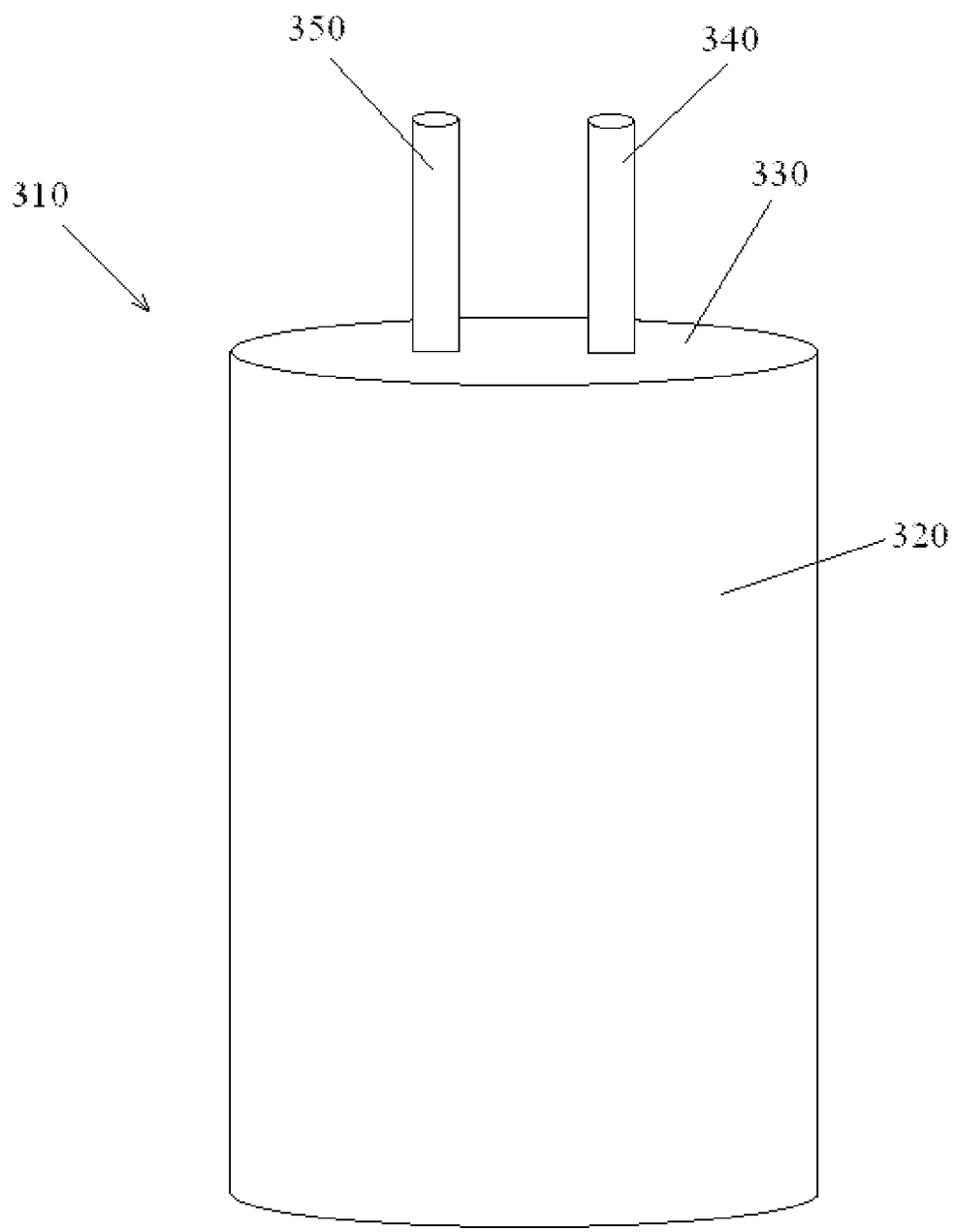
FIG. 4 illustrates a packaging arrangement for a capacitor formed from the rolled films of FIG. 3.

The rolled film assembly 300 may then be packaged. As illustrated in FIG. 4 generally at 310, in some capacitors, electrical leads 340, 350 are attached to the electrical contacts, for example contacts 150, 250 which are in electrical communication with the metal layers 110, 210 of the capacitor. In some capacitors, the rolled film assembly 300 is then inserted into a can 320 which may be fabricated from, for example, a metal such as aluminum. A layer of isolation material, for example, a polymer film, may be provided around the rolled film assembly 300 to reduce the chance of the capacitor shorting out through the material of the metal can 320. The rolled film assembly 300 is then sealed inside the metal can 320 with, for example, epoxy 330. The finished capacitor may have dimensions only slightly larger than the rolled film assembly 300. In some examples of large capacity high voltage capacitors, the final capacitor may have a diameter of about 1.75 inches (4.445 cm) and a height of between about 5 inches (12.7 cm) and about 6 inches (15.24 cm). This assembly method has the advantage of providing a hermetic seal around the rolled film assembly 300 which may reduce or eliminate the potential for moisture from the environment reaching the rolled film assembly 300. However, this assembly method has the disadvantage of being relatively costly to manufacture as compared to other methods, such as those described below.

In some capacitor manufacturing processes, the metal can 320 may be replaced with a can made of a polymer, for example, polycarbonate. A polymer can is generally less expensive than a metal can, and would generally not require the provision of an electrical isolation film about the rolled film assembly 300 to guard against electrical shorts through the material of the can, which results in further cost savings. A polymer can, however, is generally not as resistant to the permeation of moisture as a metal can. Capacitors formed in a polymer can may thus exhibit lower reliability than those packaged in metal cans due to the effects of moisture on the dielectric layer(s) of the capacitor over time.

Figure 5:
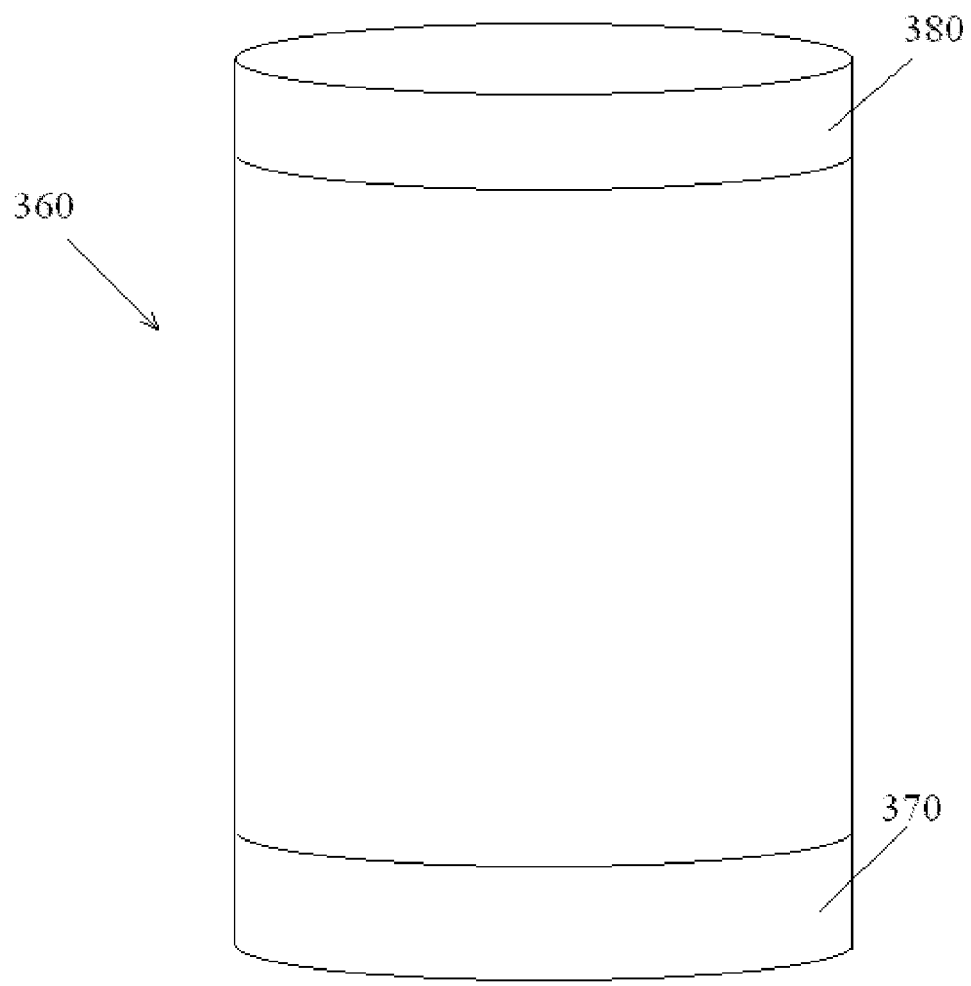
FIG. 5 illustrates an alternate packaging arrangement for a capacitor formed from the rolled films of FIG. 3.

In another method of capacitor manufacturing, the rolled film assembly 300 is encased within a plastic film, for example, by heat shrinking. Electrical contacts may be formed in a manner similar to the electrical contacts 340, 350 of FIG. 4. Alternatively, electrical contacts 370, 380 for the capacitor may be formed about the ends of the plastic encased rolled film assembly 300, as illustrated in FIG. 5, which illustrates an alternate embodiment of a capacitor, indicated generally at 360. Packaging the rolled film assembly 300 to form a finished capacitor by either of these methods is generally less costly than packaging the rolled film assembly 300 in a metal or polymer can. However, as most polymer films are permeable to moisture to some extent, this method generally produces capacitors that are less reliable than those packaged in metal or polymer cans. Alternatively, a metalized (for example, aluminized) polymer film may be used in place of or in addition to a pure polymer film for packaging a capacitor, however these films are typically more expensive than polymer-only films.

In some methods, electrical contacts, for example, electrical contacts 150, 250 may be formed after the packaging of the rolled film assembly 300 by, for example, encasing the rolled film assembly 300 in a polymer or other type of film.

Applicants have determined that capacitors may be formed by encasing a rolled film assembly 300 in a film of a material that is highly resistant to the permeation of moisture. Capacitors formed in this manner do not exhibit the reliability problems of conventional polymer film encased capacitors resulting from the permeation of moisture and the effect of the permeated moisture on the dielectric layer(s) of the capacitors. Applicants have further determined that some highly moisture resistant films may be used in the packaging of capacitors at costs less than those associated with packaging capacitors in metal or polymer cans.

An example of a highly moisture resistant material which may be formed into a film for the packaging of capacitive rolled film assemblies is polychlorotrifluoroethylene (PCTFE), available as Aclar® film from Honeywell International, Inc., Morristown, N.J. PCTFE is non-flammable, chemically resistant, has an electrical resistivity of about $10^{18}$ ohm·cm, a dielectric strength of about 500 volts/mil, a water absorption capacity of less than about 0.01% by weight (as measured in accordance with ASTM D570-98(2010)e1), a melting temperature of about 200° Celsius, and, for some commercially available PCTFE films, a water vapor transmission rate at 100° F. and 100% relative humidity of less than about 0.25 gram/$m^2$·day (measured in accordance with ASTM F1249-06(2011)). One example of a commercially available form of PCTFE film (Aclar® UltRx 4000 film from Honeywell International, Inc.) has a water vapor transmission rate of about 0.065 gram/$m^2$·day (measured in accordance with ASTM F1249-06(2011)). Other commercially available forms of PCTFE film have higher water vapor transmission rates (measured in accordance with ASTM F1249-06(2011)), for example, about 0.088 gram/$m^2$·day (Aclar® UltRx 3000 film from Honeywell International, Inc.), about 0.119 gram/$m^2$·day (Aclar® UltRx 2000 film from Honeywell International, Inc.), about 0.264 gram/$m^2$·day (Aclar® SupRx 900 film from Honeywell International, Inc.), about 0.295 gram/$m^2$·day (Aclar® Rx 20e film from Honeywell International, Inc.), about 0.310 gram/$m^2$·day (Aclar® 22a 1500 film from Honeywell International, Inc.), and about 0.419 gram/$m^2$·day (Aclar® Rx160 film from Honeywell International, Inc.). For comparison, the water vapor transmission rate of biaxially oriented polypropylene (commonly used in cigarette package moisture proofing) is about 5 gram/$m^2$·day to about 10 gram/$m^2$·day (measured in accordance with ASTM F1249-06 (2011)) and for polyester is between about 14 gram/$m^2$·day and about 21 gram/$m^2$·day (see U.S. Pat. No. 6,704,050). The water vapor transmission rate of aluminum foil laminates may be as low as about 0.001 gram/$m^2$·day. In an embodiment, a highly moisture resistant material which may be formed into a film for the packaging of capacitive rolled film assemblies comprises silicon dioxide.

In some aspects of the present invention one or both of the dielectric layers 120, 220 of a capacitor may be formed from a low moisture absorbing material, for example, PCTFE. A capacitor including dielectric layers formed of a low moisture absorbing material may not require the more costly packaging method of sealing within a metal can to prevent water vapor from changing the capacitance of the capacitor over time. Because the dielectric layers are formed of a material which does not readily absorb moisture, moisture does not cause these layers to swell or alter other physical properties, such as the dielectric constant of these dielectric layers over time. Thus, such capacitors can be packaged in a relatively inexpensive polymer film without concern for the moisture transmission rate of the polymer packaging film.

Of course it should be appreciated that a capacitor formed from such low moisture absorbing materials may also be placed in a metal or plastic can as described above, and electrical contacts may be provided in the manner described previously with respect to FIGS. 4 and/or 5.

Although the present disclosure is primarily directed to capacitive assemblies, it should be appreciated that low moisture absorbing and/or low moisture transmitting materials could also be used in the packaging of other electronic devices, for example, batteries.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of forming a capacitor, comprising:
    forming a first metal layer on a surface of a first dielectric layer having a moisture vapor transmission rate of less than about 0.25 gram/$m^2$·day, the first metal layer extending along a length and a width of the first dielectric layer but terminating prior to a first edge of first and second edges of the first dielectric layer that define the width of the first dielectric layer;
    forming a second metal layer on a surface of a second dielectric layer having a moisture vapor transmission rate of less than about 0.25 gram/$m^2$·day, the second metal layer extending along a length and a width of the second dielectric layer but terminating prior to a first edge of first and second edges of the second dielectric layer that define the width of the second dielectric layer;
    placing the first dielectric layer on top of the second metal layer with the first edge of the first dielectric layer disposed adjacent the second edge of the second dielectric layer to form a layered structure; and rolling the layered structure about itself to form the capacitor.

2. The method of claim 1, wherein forming the first metal layer on the surface of the first dielectric layer includes sputtering.

3. The method of claim 1, wherein forming the first metal layer on the surface of the first dielectric layer includes physical vapor deposition.

4. A method of forming a capacitor, comprising:

forming a first partially metal coated film having a moisture vapor transmission rate of less than about 0.25 gram/$m^2$·day by depositing a metal layer on a surface of a first dielectric layer, the first metal layer extending along a length and a width of the first dielectric layer but terminating prior to a first edge of first and second edges of the first dielectric layer that define the width of the first dielectric layer;

forming a second partially metal coated film having a moisture vapor transmission rate of less than about 0.25 gram/$m^2$·day by depositing a second metal layer on a surface of a second dielectric layer, the second metal layer extending along a length and a width of the second dielectric layer but terminating prior to a first edge of first and second edges of the second dielectric layer that define the width of the second dielectric layer;

placing the first partially metal coated film on top of the second partially coated metal film with the first edge of the first dielectric layer disposed adjacent the second edge of the second dielectric layer; and rolling the first and second partially metal coated films to form the capacitor.

5. A capacitor comprising:

a dielectric film having a moisture vapor transmission rate of less than about 0.25 gram/$m^2$·day.

6. The capacitor of claim 5, wherein the dielectric film comprises polychlorotrifluoroethylene.

\* \* \* \* \*